United States Patent [19]

Dewey et al.

[11] 4,235,556
[45] Nov. 25, 1980

[54] PLATEN VARIABLE

[75] Inventors: Chris A. Dewey, Homer; John L. Nelson, Ithaca, both of N.Y.

[73] Assignee: SCM Corporation, New York, N.Y.

[21] Appl. No.: 22,915

[22] Filed: Mar. 22, 1979

[51] Int. Cl.³ .............................................. B41J 19/96
[52] U.S. Cl. ..................................... 400/567; 74/640; 74/10.54
[58] Field of Search ................ 74/10, 54, 640; 400/567

[56] References Cited

U.S. PATENT DOCUMENTS

| | | | |
|---|---|---|---|
| 3,206,703 | 9/1965 | Ferrell | 74/640 |
| 3,385,116 | 5/1968 | Carlson et al. | 74/10.54 |
| 3,444,760 | 5/1969 | Claxton et al. | 74/10.54 |
| 3,447,385 | 6/1969 | Humphreys | 74/640 |
| 3,461,997 | 8/1969 | Humphreys | 400/567 |
| 3,931,743 | 1/1976 | Valdettaro | 74/10.54 |

Primary Examiner—William Pieprz
Attorney, Agent, or Firm—William E. Mear, III; Milton M. Wolson; Ernest F. Weinberger

[57] ABSTRACT

A platen variable apparatus is disclosed for rotatably adjusting a platen in step increments and in fine amounts in a typewriter. The apparatus includes an individual hub member rotatably mounted on a platen extension and having teeth thereon intermeshed with teeth of a flexspline fixed on the platen extension. A coarse adjusting member is fixedly coupled on the platen extension for positively rotating the platen in step increments controlled by a detent. A rotatable fine adjusting wheel has an internal wave generator surface that cooperates with the flexspline for moving the flexspline relative to the hub member which adjusts the platen in fine amounts.

3 Claims, 3 Drawing Figures

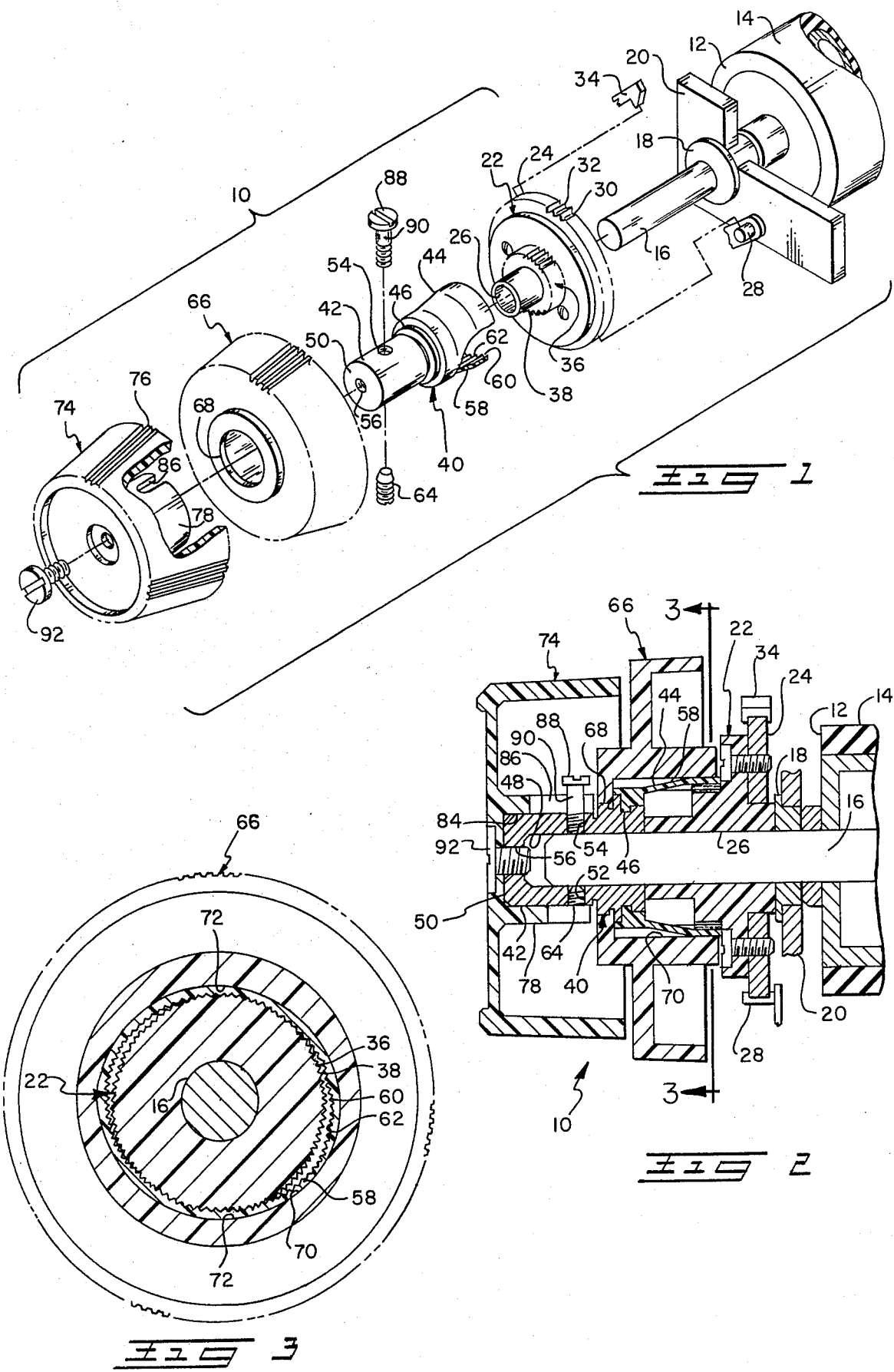

PLATEN VARIABLE

BACKGROUND OF THE INVENTION

The present invention relates to platen variable arrangements used in a typewriter or the like having a platen that rotates about its axis. More particularly, it concerns apparatus for the selective control of rates of platen rotation either in coarse step increments or in refined continuous amounts less than the step increments.

Typewriters or the like having a rotatable platen typically include a platen variable mechanism that enables the operator to manually select and control the rate of platen rotation. The platen is rotatable by a coarse adjusting means in step increments or by a fine adjusting means in continuous amounts less than the step increments. The need for operation from the coarse adjusting means occurs during paper insertion, paper removal and rapid vertical paper advancement past a printing station in the typewriter. The coarse adjusting means typically comprises a pair of platen knobs supported coaxially with the platen. The step increment movement or coarse adjustment of the platen by the platen knobs is usually controlled by a sprocket or gear means having teeth copperable with a detent device of a linespacing mechanism. The step increments are detectably felt by the operator through the selected platen knob and are in step amounts corresponding to a particular line feed spacing. In addition to and in conjunction with the coarse adjusting means, the platen variable is provided with a mechanism to rotatably adjust the platen in refined amounts. The fine adjusting means is used to manually select the position of paper fed by the platen so as to bring previously typed work into alignment with the printing station. The latter mechanism operates to rotate the platen independently of the mechanism which provides the step increments of the coarse adjusting means.

Most prior art platen variables provide mechanisms to successfully accomplish platen adjustment in coarse and fine amounts. Further, the prior art employs platen knobs for manual rotation of the platen in coarse amounts. A platen knob is directly assembled at each extreme end of the platen in a straightforward manner for rotation therewith. The prior art discloses various mechanisms used to finely adjust the platen position.

A common approach to fine platen adjustment is to provide a mechanism that disengages the platen from the linespacing mechanism, thereby permitting free rotation of the platen. Such a fine adjusting mechanism includes a release button or the like which, when axially pushed or pulled, along the platen axis, decouples the linespace mechanism to thus allow free platen rotation via the platen knobs. This type of a fine adjustment mechanism is awkward to use as it necessitates axial movement of the release button while simultaneously rotating one or both of the platen knobs.

An improved design for a platen variable is disclosed in U.S. Pat. No. 3,461,997 granted on Aug. 19, 1969 to Donald R. Humphreys. This patent teaches a knob assembly comprising a coarse adjusting knob for incremental indexing of a platen in conjunction with a fine adjusting knob for a more refined platen adjustment. Each knob is independently manually operable. The manner in which a refined adjustment is accomplished is based on a known harmonic drive device disclosed in U.S. Pat. No. 2,906,143 granted Sept. 29, 1959 to C. Walton Musser. While the Humphreys patent is a successful improvement, the design as disclosed is undesirable for the reason that the manner of use for satisfactory operation is both confusing and unconventional. By way of example, two embodiments are disclosed in the Humphreys patent. The first embodiment includes the undesirable placement of the fine adjusting knob outboard from the coarse adjusting knob. This arrangement will tend to confuse the operator as to the intended function of each adjusting member. The second embodiment corrects this problem by reversing the locations of the adjusting members. However, the resulting motion of the platen in response to rotation of the adjusting knob members is highly unacceptable. Specifically this embodiment includes an arrangement of parts that provides for a rotation of the platen by the fine adjusting knob in a direction opposite to that which results when the same manipulation is applied to the coarse adjusting knob. There is then an inconsistency in the direction motion of the platen as effected by the coarse and fine adjusting knobs, respectively.

SUMMARY OF THE INVENTION

The general purpose of the present invention is to provide a platen variable apparatus for use in a typewriter or like machine having a rotatable platen comprising an arrangement of parts that readily enables the user to select discrete platen advancing rates without the attendant disadvantages of prior art devices. The apparatus is supported on an axial extension fixed to one end of the platen and includes a coarse platen adjusting knob coupled by a shoulder screw means to a flexspline fixed on the axial extension. The coarse platen adjusting knob is thus directly coupled to rotate the platen whose motion is in a step increment controlled by a sprocket cooperating with a conventional linespacing detent means. The sprocket is coaxially supported on a rotatable hub member and receives it motion from the coarse platen adjusting knob through the flexspline which is anchored to the hub member by engagement between the internal spline teeth carried by the flexspline and the circular spline teeth on the hub member. A more refined angular adjustment rate of the platen is accomplished by finger rotation of a fine platen adjusting wheel. The drive transmission used to finely rotate the platen comprises the elements for accomplishing a known harmonic drive principle fully disclosed in the aforementioned U.S. Pat. No. 2,906,143 Musser patent. The harmonic drive elements of the present invention include the flexspline having internal spline teeth, the circular spline teeth on the hub member, and a wave generator surface on the fine platen adjusting wheel. Each of the elements coacts with the others during fine adjustment operation to provide a substantially reduced output motion of the platen as compared to the input motion applied to the fine platen adjusting wheel. The input member is the fine platen adjusting wheel having an inner smooth bearing surface constructed in the form of an ellipse-like cam having opposing lobes and hereinafter referred to as the wave generator surface. The flexspline includes a flexible band or ring portion extending toward the hub member. The band carries on its inner surface internal spline teeth while its outside periphery is smooth for sliding engagement with the wave generator surface. The circular spline teeth on the hub member and the internal spline teeth have an identical circular pitch dimension. However, the circular spline is smaller in circumference that the internal spline, and includes fewer teeth. Assembly of the fine adjusting wheel places the wave generator surface into frictionally rotatable engagement with the smooth outside surface of the band portion of the flexspline thereby deflecting the band to conform to the dimension size of the wave generator surface. In this position, some of the internal spline teeth are meshed with some of the circular spline teeth on the hub member and due to the lobes on the wave generator surface, spline engagement occurs at opposing spaced localities on the circular spline. During fine platen adjustment, the hub member and its circular spline teeth are held fixed by the sprocket, which is engaged with the detent. For fine platen adjustment, the fine adjusting wheel is manually rotated about its central axis. As a result of this action, the areas of deflection (at the lobes) causing spline engagement move around the periphery of the stationary circular spline. Each internal tooth moves radially in and out of mesh as engagement progresses from one tooth to the next tooth on the circular spline. A graphic development of this motion depicts a curve generally having the character of a sinusoidal wave, hence the term wave generator surface. A continuous movement of the wave generator surface drives the flexspline at a comparatively greatly reduced rate of rotation, the angular amount being equal to the difference in the number of teeth. Also, the direction of rotation of the flexspline corresponds to the direction of rotation applied to the fine adjusting wheel because the circular spline teeth are stationary during fine platen adjustment. Consequently, by having the coarse platen adjusting knob directly coupled to platen by the shoulder screw and indirectly coupled to the sprocket through the flexspline, and by having the fine platen adjusting knob indirectly coupled to the platen through the flexspline a unique and significantly different structure from the prior art is herein disclosed.

Accordingly, an object of the present invention is to provide a platen variable apparatus for a typewriter capable of selective rates of rotation either in step increments or in fine angular amounts.

A further object of the present invention is to provide a platen variable apparatus that is efficient, reliable, rapid in use, accurate in response, low in manufacturing cost, extremely easy to assembly and easily adaptable to most conventional platen structures.

Other objects, features and advantages will become more apparent from the following description, including the appended claims and the accompanying drawing.

BRIEF DESCRIPTION OF THE DRAWING

FIG. 1 is an exploded view, in perspective, of a platen variable apparatus according to the invention which is assembled on an axial extension of a platen.

FIG. 2 is a cross-sectional view of the platen variable apparatus built in accordance with the teachings of the present invention.

FIG. 3 is a slightly enlarged sectional view taken along line 3—3 of FIG. 2 showing the relationship between parts used to transmit a fine adjustment of the platen.

DESCRIPTION OF THE PREFERRED EMBODIMENT

In the illustrated embodiment of FIGS. 1 and 2, there is shown a platen variable apparatus 10 arranged at one end 12 of a platen 14 in a typewriter or like machine.

The platen 14 cooperates with a known paper feed mechanism (not shown) to vertically transport a recording medium past a printing station.

The platen 14 has a fixed cylindrical axial extension 16 that projects from platen end 12 through a bearing 18 mounted on a carriage end plate 20 to permit free rotation of the platen 14 about its axis. It is to be understood that a pair of similar carriage end plates 20 are provided for support of the platen 14 at each of its spaced ends, and the platen variable 10 may be assembled at either or both ends of the platen 14. The cylindrical axial extension 16 projects beyond end plate 20 for the coaxial support of the platen variable apparatus 10. In order to best understand the present arrangement, the platen variable apparatus 10 will now be described in the order of assembly on the axial extension 16.

A hub member 22 coaxially carries a sprocket 24. A central bore 26 extends through the hub member 22 to slidably receive the axial extension 16 and when assembled is freely rotatable thereon. The central portion of hub member 22 along the bore 26 is elongated to function as a stabilizing bearing surface for maintaining vertical orientation of the hub member 22 and sprocket 24. Hub member 22 is placed on the axial extension 16 in abutting relationship with the bearing 18 (FIG. 2) to limit its axial movement toward the platen 14. In this position, sprocket 24 is in vertical (longitudinal) alignment for operational engagement with a line-spacing detent roller 28. Detent roller 28 is typically urged toward sprocket 24 to rest in a valley 30 between adjacent sprocket teeth 32 uniformly arranged on the circular periphery of sprocket 24. The angular distance between each adjacent valley 30 corresponds to an angular step increment advance of the platen 14 to line feed the recording medium. The sprocket 24 is preferably constructed from a material, for example metal, which resists wear or possible breakage of teeth 32 due to its being subjected to high torsional impact forces from a powered feed pawl 34 of the linespacing mechanism. The hub member 22 is preferably formed from a moldable rigid plastic material to provide for economical manufacture of external spline gear 36 having circular spline teeth 38 thereon and for efficient long life of the bearing surface of the bore 26. A flexspline 40 includes a rigid cylindrical member portion 42 and a flexible band or ring portion 44 integrally connected on one end 46 of the cylindrical member portion 42. A central recessed bore 48 sized to receive axial extension 16 partially extends through the cylindrical member portion 42 for supporting flexspline 40 on the axial extension 16 and terminates at end wall 50. Cylindrical member portion 42 is provided with a plurality of thread tap apertures 52, 54 and 56. The band portion 44 is formed of a flexible plastic material and comprises a tubular thin wall section 58 which is slightly tapered outward from its rigid connection with end 46 of the cylindrical member portion 42. Circumferentially molded on an internal surface of the thin wall section 58 is an internal spline gear 60 having internal spline teeth 62 that horizontally extend along the taper toward the free end of band portion 44. The external surface of the thin wall section 58 is smooth and functions as an anti-friction bearing surface. Flexspline 40 is supported on axial extension 16 by central recess bore 48 such that its rigid end 46 is in abutting relationship with assembled hub member 22 thereby limiting its axial movement toward platen 14. In this position (FIG. 2), the internal spline teeth 60 on band portion 44 overlie circular spline teeth 38 on the hub member 22. Flexspline 40 is secured to the axial extension 16 by locking a set screw 64 disposed in threaded aperture 52 of cylindrical member 42. Thus, rotational motion of the flexspline 40 is directly transferred to the axial extension 16 which, in turn, rotates the platen 14. The cylindrical member portion 42 of the flexspline 40 is constructed from a rigid material, such as metal, so as to permit tap threading of apertures 52, 54 and 56. The bi-material construction of the flexspline 40 is most desirable to satisfy the functional requirements for operation of the flexspline 40. For example, the tubular wall of the cylindrical member portion 42 must be rigid for support of the flexspline 40 and the relatively thin wall section 58 of the band portion 44 must be capable of flexure.

A fine platen adjusting wheel 66 is the next member to be assembled. A central bore 68 is provided for free rotatable support on the cylindrical member portion 42 of the flexspline 40. A wave generator surface 70 is provided on an internal recess of the fine platen adjusting wheel 66 and, when assembled, surface 70 slidably engages the smooth external surface of the thin wall section 58 which is deflected to conform with the shape of surface 70. In the assembled position, wave generator surface 70 functions as an anti-friction bearing with the smooth external surface of thin wall section 58 to permit relative sliding therebetween with minimal frictional resistance. As shown in FIG. 3, the internal wave generator surface 70 is preferably dimensioned in the form of an ellipse-like cam having a pair of opposing lobes 72 that are constructed from a major ellipse axis. The wave generator surface 70 delfects opposing areas of the band 44 inward so as to mesh a number of internal spline teeth 62 carried on band 44 with a number of circular spline teeth on the hub member 22.

In the preferred embodiment above, wave generator surface 70 is shown as an ellipse providing spline engagement at spaced localities. However, in accordance with a known harmonic drive construction, such as disclosed in aforementioned 2,906,143 patent, surface 70 may alternatively be trilobar for effecting three meshing localities, or multilobar, provided a suitable difference in the number of teeth 38 and 62 is maintained. In harmonic drive devices, the numerical difference in the number of teeth between coacting gear elements is always a multiple of the number of lobes 72 on the wave generator surface 70. For example, in the preferred embodiment the teeth 38 of rigid circular spline gear 36 are eighty in number and the teeth 62 of deflectable internal spline gear 60 are eighty-two in number. This provides a tooth differential of two which is equal to the number of lobes 72 on the wave generator surface 70. The circular pitch measurement for the gears 36 and 60 is identical. The circumferential measurement taken around each spline is different, since this measurement is dependent on the number of teeth included on each gear. The internal spline gear 60 is circumferentially larger than the external spline gear 36. This accounts for the overlap relationship between spline teeth 38 and 62 in the nondeflected state.

Referring again to FIGS. 1 and 2, a coarse platen adjusting knob 74 is assembled on flexspline 40 outward from the fine adjusting wheel 66 and includes finger-engageable peripheral grooves 76 for gripping ease by the operator during manipulation. The coarse platen adjusting knob 74 includes a central hub 78 having a bore 84 extending partially therethrough for coaxial support on the cylindrical member portion 42 of the flexspline 40. An elongated aperture or slot 86 along the central hub 78 of coarse knob 74 provides passage for a screw 88 which is placed in threaded aperture 54 so as to abut axial extension 16. Screw means 88 includes a smooth, load-bearing shoulder portion 90 that engages the sides of the elongated aperture 86 to transmit angular drive to the flexspline 40 from the coarse platen adjusting knob 74. Hence the coarse adjusting knob 74 is directly coupled to the axial extension 16 through the flexspline 40 to effect rotation of the platen 14 in response to manual rotation of the coarse platen adjusting knob 74. The platen 14 is rotated in the same direction and at the same rate as applied by the operator to the coarse adjusting knob 74. A screw 92 extends through the coarse adjusting knob 74 into the threaded aperture 56 in the cylindrical member portion 42 to axially attach the coarse knob 74 on the flexspline 40.

For rotating the platen 14 in step increments, the operator manually rotates the coarse platen adjusting knob 74 by gripping grooves 76. Turning forces are transmitted from the coarse knob 74 to the flexspline 40 through the contact between one side of the elongated aperture or slot 86 and the shoulder abutment 90. This contact will rotate the axial extension 16 therewith through the flexspline 40 connection at set screw 64 which, in turn, will rotate the platen 14. Step increment motion is controlled by the sprocket 24 in cooperation with the detent roller 28. Motion from the coarse platen adjusting knob 74 is transferred to the sprocket 24 through the engagement between circular spline teeth 38 and internal spline teeth 62 which will rotate the hub member 22 carrying the sprocket 24. Detent roller 28, preventing movement of the platen 14, slidingly engages each tooth 32 of the sprocket 24 as that tooth passes and thus offers a detectable resistance when moved from one valley 30 to the next.

For a finer adjustment of the platen 14, intermediate to and independent of the step increments, the operator selectably rotates the fine platen adjusting wheel 66. During such fine fine platen adjustment, the sprocket 24 and connected hub member 22 are held stationary by the detent roller 28. The transmission of drive from the fine platen adjusting wheel 66 to the platen 14 includes harmonic drive elements coacting to rotate the platen 14 at a substantially reduced rate compared to the rate of rotation applied to the fine adjusting wheel 66. The harmonic drive elements include the wave generator surface 70 carried on the inner surface of the fine adjusting wheel 66 which functions as the fine adjustment drive input. The external spline gear 36 by being held stationary, controls the direction of rotation transmitted to the flexspline 40, such that, as is desirable, it is in the same direction as the rotation applied to the fine adjusting wheel 66. As the wave generator surface 70 rotates about its central axis, the areas of engagement, between spline teeth 38 and 62 are propagated in a wave about the platen 14 central axis. As the lobes 72 move around the periphery of external spline gear 36, internal spline teeth 62, adjacent the lobes 72, move radially in and out of engagement. As each one of the internal spline teeth 62 moves toward mesh position, an angular drive is applied to the flexspline 40. At full spline engagement, the drive force is zero. Flexspline 40 drive occurs only as a result of internal spline teeth 62 advancing toward mesh.

The reduced rate of platen 14 rotation from the fine platen adjusting wheel 66 via the harmonic drive elements (70, 40, and 38) can be expressed as a relative reduction ratio therebetween. In harmonic drive devices of this kind, the reduction ratio can be obtained by dividing the difference in circumference between the two spline gears 36 and 60 into the circumference of the output member, which is flexspline 40. Since internal spline gear 60 on flexspline 40 and external spline gear 36 have identical circular pitch measurements, the number of teeth can be substituted for the circumferential measurement. Therefore, the reduction ratio can be computed by dividing the difference between the number of spline teeth 38 and 62 into the number of teeth on the rotating output member (flexspline 40). The reduction ratio for the preferred embodiment is as follows:

82 (No. of teeth on output member 40)/2 (Tooth differential)

which results in a reduction ratio of 41:1. Simply stated, in order to accomplish a full revolution of the platen 14 from the fine platen adjusting wheel 66, it must be rotated 41 full revolutions. For a full 360° motion or one revolution of the fine platen adjusting wheel 66, the amount of platen 14 movement is computed in degrees of angular displacement as follows:

$$360°/41 = 8.7805°$$

Since angular rotation of the platen 14 by coarse platen adjusting knob 74 is direct and at a 1:1 ratio, 360° angular movement of the platen 14 occurs for each full revolution of the coarse adjusting knob 74. Compared to 8.7805° angular movement of the platen 14 upon a full revolution of the fine platen adjusting wheel 66 illustrates a substantial reduction of angular movement of the platen 14 between the adjusting members. Further, for any amount of rotation of the platen 14 by the coarse adjusting knob 74, such as a step increment defined by sprocket 24 and controlled by detent 28, a corresponding amount of angular motion applied to the fine adjusting wheel 66 will result in transmitting much less angular motion to the platen 14. Therefore, the platen 14 can be rotatably positioned by the fine adjusting wheel 66 to any desired angular location intermediate any step increment of the coarse adjusting knob 74.

Although the present embodiment of the apparatus is illustrated and described as being assembled on the left end 12 of the platen 14, it could easily be placed at the other end (or both ends) of the platen without changes being made to the parts as described.

The advantages of the platen variable apparatus 10 described herein are numerous. The use of screws 64, 88 and 92 for coupling members provides economical rapid assembly in addition to accurate rigid placement of parts. Further, by using screws 64 and 88 to rigidly couple members for transmitting angular drive motions, costly and relatively complex positive drive connections such as key means are avoided.

The arrangement of this assembly is most desirable and includes having the coarse platen adjusting member 74 mounted furthest from the platen 14 in order to provide a location that is easily accesible to the operator. This is important, since the coarse adjusting member 74 is used more frequently than the fine platen adjusting member 66. Also, the construction of each adjusting member 66 and 74 enables easy hand manipulation by the operator. For example, the coarse adjusting knob 74 is rotated by gripping peripheral grooves 76 while the fine adjusting wheel 66 operates like a thumbscrew. As described, each adjusting member 66 which also has a serrated circumference, (serration not numbered), and 74 operates independently of the other manipulation easily being accomplished with just one hand.

Service life of the apparatus is extended due to the absence of parts subjected to excessive wear. The sliding frictional engagement between the wave generator surface 70 and the smooth external surface of the thin wall section 58 is functional and presents no excessive wear problems. Also, the inner action of the harmonic drive results from deflection applied to the flexspline 40 by advancing wave surface 70. There is virtually no sliding between spline teeth 38 and 62 as they advance toward mesh because the sides of the teeth are in surface engagement rather than line engagement.

As pointed out, the platen variable apparatus 10 is supported entirely on the cylindrical axial extension 16, thus providing an apparatus that is readily adaptable to be mounted on many existing machines without necessitating costly manufacturing changes.

While the foregoing description has shown and described the fundamental novel features as applied to a preferred embodiment, it will be understood by those skilled in the art that modifications embodied in various forms may be made without departing from the spirit and scope of the invention.

What is claimed is:

1. Apparatus in a typewriter or the like providing operator selection of rotation of a platen about its axis either in step increments controlled by a detent means or in angular amounts less than the step increments, the platen having an axial extension for support of the apparatus, the apparatus comprising:
    a coarse adjusting knob rigidly coupled to the axial extension for rotating the platen in step increments;
    a hub member rotatably mounted on the axial extension, said hub member independent of said coarse adjusting knob and having circular spline teeth;
    a sprocket rigidly secured to said hub member for rotational movement therewith and cooperatively engageable with the detent means;
    a flexspline rigidly secured to the axial extension and having internal spline teeth overlying and being greater in number than said circular spline teeth on said hub member; and
    a fine adjusting wheel mounted on said flexspline between said coarse adjusting knob and the platen for rotational movement relative thereto and having an internal wave generator surface for cooperation with said flexspline to mesh said internal spline teeth of said flexspline with said circular spline teeth on said hub member at circumferentially spaced localities whereby rotation of said fine adjusting wheel rotates the platen in angular amounts less than the step increments.

2. The apparatus according to claim 1, wherein said coarse adjusting knob comprises:
    a central hub extending from an end wall for support on said flexspline, said end wall having an axial aperture;
    an axial screw means passing through said aperture of said end wall for axially attaching said coarse adjusting knob on said flexspline; and
    said central hub having an opening engageable with an outward abutment on said flexspline for transmitting rotational motion from said coarse adjusting knob to said flexspline.

3. The apparatus according to claim 1, wherein said fine adjusting wheel is rotatably mounted on portions of said flexspline located inboard of said coarse adjusting knob and driving rotation of said fine adjusting knob effects rotation of the platen in a corresponding direction.

* * * * *